United States Patent
Hao et al.

(10) Patent No.: US 11,080,486 B2
(45) Date of Patent: Aug. 3, 2021

(54) REMOTE NEURAL NETWORK PROCESSING FOR GUIDELINE IDENTIFICATION

(71) Applicant: International Business Machines Corporation, Armonk, NY (US)

(72) Inventors: Bibo Hao, Beijing (CN); Gang Hu, Beijing (CN); Jian Min Jiang, Beijing (CN); Jing Mei, Beijing (CN); Changhua Sun, Beijing (CN); Guo Tong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1094 days.

(21) Appl. No.: 15/590,066

(22) Filed: May 9, 2017

(65) Prior Publication Data

US 2018/0330230 A1    Nov. 15, 2018

(51) Int. Cl.
*G06F 40/30* (2020.01)
*G06F 16/33* (2019.01)
*G06N 3/04* (2006.01)
*G06F 40/216* (2020.01)

(52) U.S. Cl.
CPC ............ *G06F 40/30* (2020.01); *G06F 16/334* (2019.01); *G06F 40/216* (2020.01); *G06N 3/0445* (2013.01); *G06N 3/0454* (2013.01)

(58) Field of Classification Search
CPC ...... G06F 40/30; G06F 16/334; G06F 40/216; G06N 3/0445
See application file for complete search history.

(56) References Cited

U.S. PATENT DOCUMENTS

| 9,230,061 B2 | 1/2016 | Ephrat et al. |
| 2008/0059391 A1 | 3/2008 | Rosales et al. |
| 2008/0275731 A1 | 11/2008 | Rao et al. |
| 2011/0295782 A1 | 12/2011 | Stojadinovic et al. |
| 2013/0071087 A1* | 3/2013 | Motiwala ............... G11B 27/34 386/241 |

(Continued)

OTHER PUBLICATIONS

Yang et al. Hierarchical Attention Networks for Document Classification. Proceedings of NAACL-HLT 2016, pp. 1480-1489, San Diego, California, Jun. 12-17, 2016. (Year: 2016).*
Pavel Shvaiko, Jerome Euzenat. Ontology matching: state of the art and future challenges. IEEE Transactions on Knowledge and Data Engineering, Institute of Electrical and Electronics Engineers, 2013, 25 (1), pp. 158-176. 10.1109/TKDE.2011.253. hal-00917910 (Year: 2013).*

(Continued)

*Primary Examiner* — Alexey Shmatov
*Assistant Examiner* — Robert Bejcek, II
(74) *Attorney, Agent, or Firm* — Law Office of Jim Boice (57) ABSTRACT

A computer implemented method identifies guidelines through use of a neural network by a remote guideline server. A client computer transmits instructions to the remote guideline server to retrieve and evaluate multiple candidate guidelines. The remote guideline server utilizes a neural network to identify a string of terms found in each of the multiple candidate guidelines that match one or more strings of terms from a model guideline; to identify a semantic concept of each of the multiple candidate guidelines that matches one or more semantic concepts from the model guideline; and to identify a structural pattern of each of the multiple candidate guidelines that matches one or more structural patterns of the model guideline. The candidate guidelines that match the model guideline are then sent from the remote guideline server to the client computer.

19 Claims, 8 Drawing Sheets

(56) References Cited

U.S. PATENT DOCUMENTS

| | | | | |
|---|---|---|---|---|
| 2014/0067373 A1* | 3/2014 | Wasserblat | ............. | G10L 15/02 |
| | | | | 704/9 |
| 2014/0343957 A1 | 11/2014 | Dejori | | |
| 2014/0365232 A1* | 12/2014 | Sadeghi | ................ | G06F 40/14 |
| | | | | 705/2 |

OTHER PUBLICATIONS

BIOS Flash Update (MicrosoftWindows)—IBM System x3550. IBM Support. 2011. (Year: 2011).*

P. Mell et al., "The NIST Definition of Cloud Computing", National Institute of Standards and Technology, Information Technology Laboratory, Sep. 2011, pp. 1-7.

Song et al., "Comparison of Machine Learning Algorithms for Classification of the Sentences in Three Clinical Practice Guidelines". Health Inform Res., Mar. 31, 2013, pp. 16-24. <https://www.ncbi.nlm.nih.gov/pubmed/23626914>.

Lin et al., "Identifying and Using Good Practice Guidelines". Agency for Healthcare Research and Quality, Rockville, Maryland, MD, University of Virginia School of Medicine, Charlottesville, Virginia, Jul. 1, 2009;80(1):67-69. <http://www.aafp.org/afp/2009/0701/p67.html>.

Wenzina et al., "Goals: Modeling Clinical Guidelines Based on Timeml Concepts". Proceedings of the 5th International Conference on Digital Health, 2015, pp. 121-128. <http://dl.acm.org/citation.cfm?id=2750520>.

Jonnalagadda et al., "Enhancing Clinical Concept Extraction With Distributional Semantics". J Biomed Inform, Feb. 2012, 45(1): 129-140. <https://www.ncbi.nlm.nih.gov/pmc/articles/PMC3272090/>.

* cited by examiner

REMOTE NEURAL NETWORK PROCESSING FOR GUIDELINE IDENTIFICATION

BACKGROUND

The present invention relates generally to the field of computers. Still more particularly, the present invention relates to the field of computers that use neural networks.

SUMMARY

In a computer-implemented method embodiment of the present invention, a client computer transmits instructions to a remote guideline server to retrieve and evaluate multiple candidate guidelines. The instructions direct the remote guideline server to: identify and retrieve multiple candidate guidelines; identify, by use of a neural network, a string of terms found in each of the multiple candidate guidelines that match one or more strings of terms from a model guideline; identify, by use of the neural network, a semantic concept of each of the multiple candidate guidelines that matches one or more semantic concepts from the model guideline, where the semantic concept of each of the multiple candidate guidelines is based on the string of terms found in each of the multiple candidate guidelines; identify, by use of the neural network, a structural pattern of each of the multiple candidate guidelines that matches one or more structural patterns of the model guideline, where the structural pattern of each of the multiple candidate guidelines is based on the semantic concept of each of the multiple candidate guidelines and the string of terms found in each of the multiple candidate guidelines; compare, by use of the neural network, a combination of the string of terms, the semantic concept, and the structural pattern for each of the multiple candidate guidelines to the string of terms, the semantic concept, and the structural pattern of the model guideline; and identify, by use of the neural network, one or more of the multiple candidate guidelines whose string of terms, semantic concepts, and structural patterns match the string of terms, semantic concept, and structural pattern of the model guideline in order to identify one or more identified guidelines. The client computer transmits, to the remote guideline server, a request for one or more guidelines that have been identified by the remote guideline server. The client computer then receives the one or more identified guidelines from the remote guideline server.

Other embodiments of the present invention include a computer system and a computer program product.

DETAILED DESCRIPTION

Figure 1:
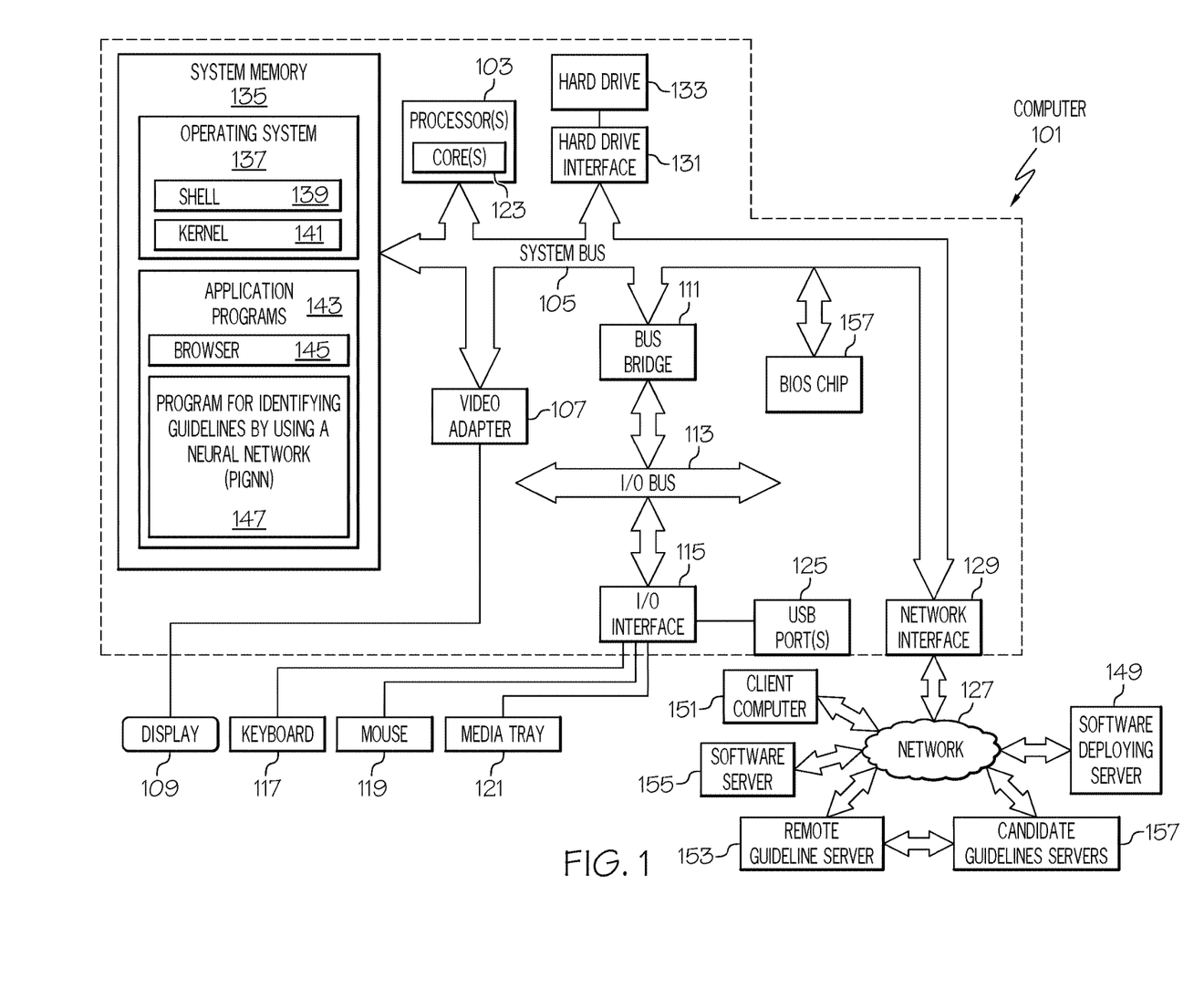
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. In some embodiments, part or all of the exemplary architecture, including both depicted hardware and software, shown as associated with and/or within computer 101 can be utilized by software deploying server 149, client computer 151, remote guideline server 153, software server 155, and/or candidate guidelines servers 157 shown in FIG. 1.

With further reference to FIG. 1, exemplary computer 101 includes processor(s) 103, operably coupled to a system bus 105, which further operably couples various internal and external components. Processor(s) 103 may embody or use one or more processor core(s) 123. A video adapter 107, which drives/supports a display 109, is also coupled to system bus 105.

System bus 105 is coupled via a bus bridge 111 to an input/output (I/O) bus 113. An I/O interface 115 is coupled to I/O bus 113. I/O interface 115 enables communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted in FIG. 1, a basic input/output system (BIOS) chip 157 is coupled to system bus 105. BIOS chip 157 is firmware that performs hardware utilization during booting operations of computer 101 by initializing and testing hardware components that are coupled to and/or are within computer 101, and then loads operating system 137 into system memory 135.

As depicted, network interface 129 is also coupled to system bus 105. Network interface 129 can be a hardware network interface, such as a network interface card (NIC), etc. Computer 101 is able to communicate with software deploying server 149, client computer 151, remote guideline server 153, software server 155, and/or candidate guidelines servers 157 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 may include one or more wireless networks, such as a Wi-Fi network, and/or cellular networks. An example embodiment of the present invention utilizes a network "cloud" environment, which will be discussed with reference to FIG. 7 and FIG. 8.

Referring again to FIG. 1, a hard drive interface 131 is also coupled to system bus 105. Hard drive interface 131 interfaces with a hard drive 133. In some embodiments, hard drive 133 is a non-volatile form of memory for storing and populating system memory 135 (e.g., a volatile form of memory, such as so-called random access memory (RAM)), which is also coupled to system bus 105.

In some embodiments, system memory may be considered a lowest level of volatile memory in computer 101. System memory 135 may include additional, higher levels of volatile memory (not shown), including, but not limited to, cache memory, registers and buffers. Logic and/or data (not depicted) residing in system memory 135 can include or be associated with operating system (OS) 137 and application programs 143. In some embodiments, part or all of system memory 135 can be shared and/or distributed across one or more systems. In some embodiments, application programs 143 may be distributed across one or more software deploying servers 149 or other systems.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 can include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 include a Program for Identifying Guidelines by using a Neural Network (PIGNN) 147. In this example, PIGNN 147 includes program instructions (software) adapted for implementing processes and/or functions in accordance with the present invention, such as (without limitation) those described with reference to FIGS. 2-6. In some embodiments, PIGNN 147 is downloaded from software deploying server 149, (on-demand or "just-in-time") e.g., where the PIGNN 147 software is not downloaded until needed for execution. In some embodiments of the present invention, software deploying server 149 can perform one or more functions associated with the present invention (including execution of PIGNN 147), thus freeing computer 101 from having to use its internal computing resources.

The elements depicted in computer 101 are not intended to be exhaustive, but rather are representative to highlight certain components in accordance with example embodiments of the present invention. For instance, computer 101 may include alternate memory storage devices such as flash memory, magnetic cassettes, digital versatile disks (DVDs), Bernoulli cartridges, etc. These and other variations are intended to be within the spirit and scope of the present invention.

As described herein, the present invention identifies a resource as being a guideline for performing a certain task or set of tasks. For example, the guideline may be a set of instructions or statements that guide a user in troubleshooting a computer system, diagnosing and/or treating diseases, utilizing a computer resource, etc. One or more embodiments of the present invention identify such guidelines according to terms found in (or used by) candidate resources, a semantic concept of the candidate resources (based on the terms), and a structural pattern of the candidate resources (based on the terms and/or the semantic concept).

In order to preserve bandwidth and to improve the functioning of a network, in one or more embodiments of the present invention a remote guideline server performs the identification of the guideline. For example, consider FIG. 2, which shows client computer 151 coupled via a network 127 to a remote guideline server 153 (all introduced in FIG. 1). If the process described here for identifying a resource as being a guideline were performed by the client computer 151, then 1) the resources of client computer 151 would be overtaxed, and 2) the bandwidth of network 127 would be overtaxed since all candidate guidelines 202a-202n from the candidate guideline servers 157 would have to be sent to the client computer. However, by having the remote guideline server 153 perform the processes described herein for identifying guidelines, the bandwidth of the network 127 is conserved. Furthermore, if the candidate guidelines 202a-202n are actually stored within the remote guideline server 153 (instead of the candidate guidelines servers 157), then no network bandwidth is consumed between the remote guideline server 153 and the client computer 151 when retrieving the candidate guidelines 202a-202n.

Figure 2:
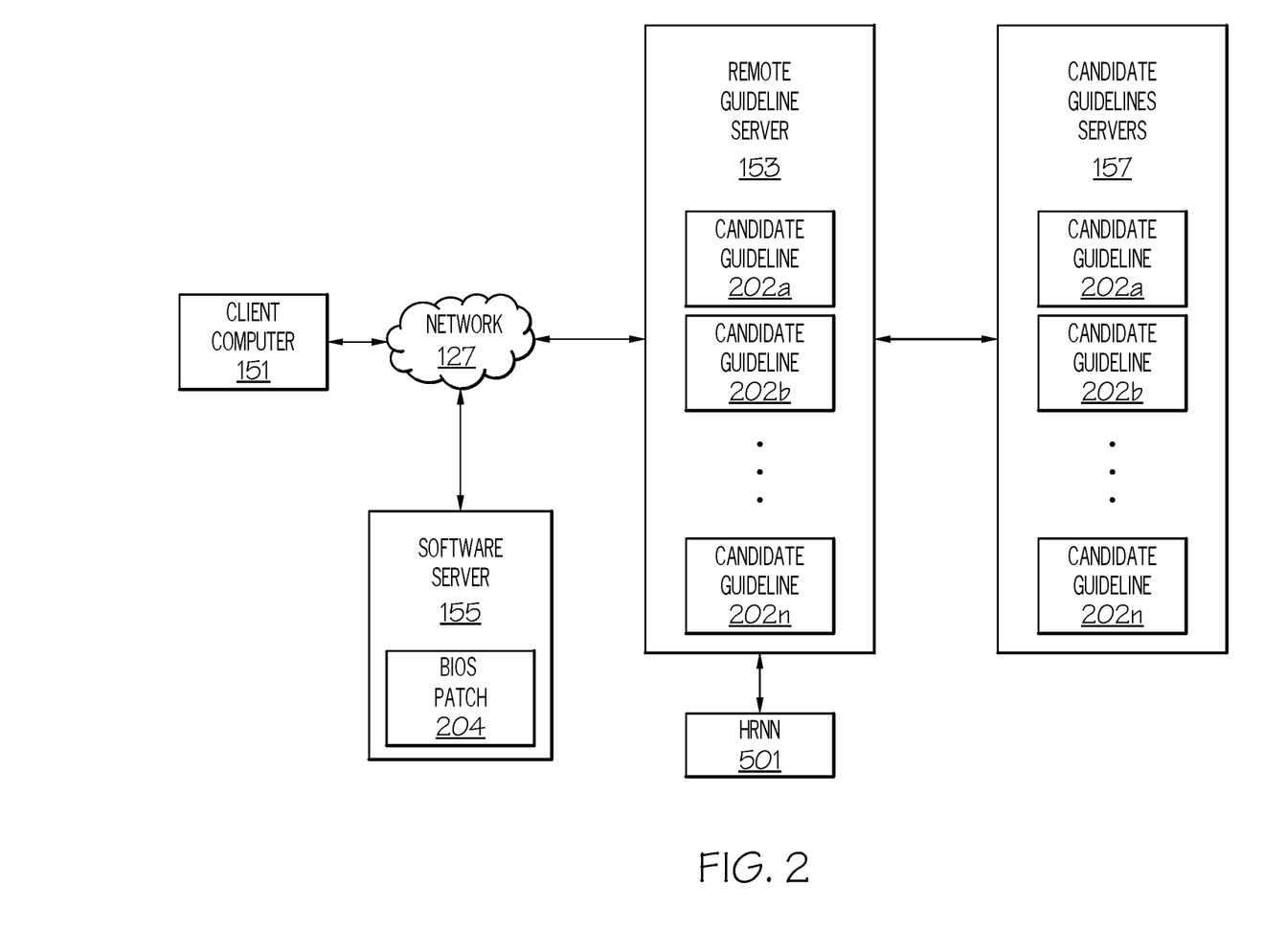
FIG. 2 illustrates a relationship between a client computer and a remote guideline server, and between the remote guideline server and multiple candidate guidelines servers in accordance with one or more embodiments of the present invention.

In one or more embodiments of the present invention, the candidate guidelines 202a-202n are instructions for improving a functionality of client computer 151. For example, candidate guideline 202a may be instructions for installing a software patch into the basic input/output system (BIOS) chip (e.g., BIOS chip 157 shown in FIG. 1). In an embodiment of the present invention, within these instructions is an executable link to software server 155 that, when executed causes a BIOS patch 204 (i.e., software that improves the function of computer 101 when loaded into BIOS chip 157) to be sent to the client computer 151. Software (e.g., PIGNN 147) within client computer 151 recognizes BIOS patch 204 when it is received by client computer 151, and automatically installs BIOS patch 204 into the BIOS 157 in the client computer 151.

In one or more embodiments of the present invention, the hierarchical analysis of the candidate guidelines 202a-202n is performed by a neural network. The neural network used may be a recurrent neural network (RNN) or a hierarchical recurrent neural network (HRNN) 501, each of which are types of deep neural networks (DNN), which are described in detail below.

A recurrent neural network (RNN) is a neural network in which any node in the neural network can be revisited (returned to) from another node after the process leaves the node. That is, logical processes are not one-directional only, but rather can circle back to an earlier node.

A hierarchical recurrent neural network (HRNN), as the name implies, uses a set of RNNs that have their own hierarchy. That is, a higher RNN may utilize the outputs of nodes from a lower RNN to create the HRNN 501 shown in FIG. 2 and described below in FIG. 5.

By way of introduction and overview only, a neural network with regard to some embodiments of the present invention refers to a computer architecture that emulates biological neural networks. That is, a biological neural network (e.g., a human brain) is made up of biological neurons that communicate with one another bioelectrically. A biological neuron has dendrites that are connected to a soma, which combines bioelectric signals from the dendrites. These combined bioelectric signals are then transmitted along an axon, which terminates at an axon terminal. Neurotransmitters then pass the bioelectric signals across a synapse from the axon terminal to the dendrites of a next neuron.

An electronic neural network uses an architecture that is conceptually similar to that of a biological neural network. However, the "neurons" in an electronic neural network are made up of electronic components, and these electronic neurons use electronic (instead of bioelectric) signals. If the electronic neural network includes multiple hidden layers of neurons between the input and output layers of the electronic neural network, then such an electronic neural network is referred to as a deep neural network (DNN).

Figure 3:
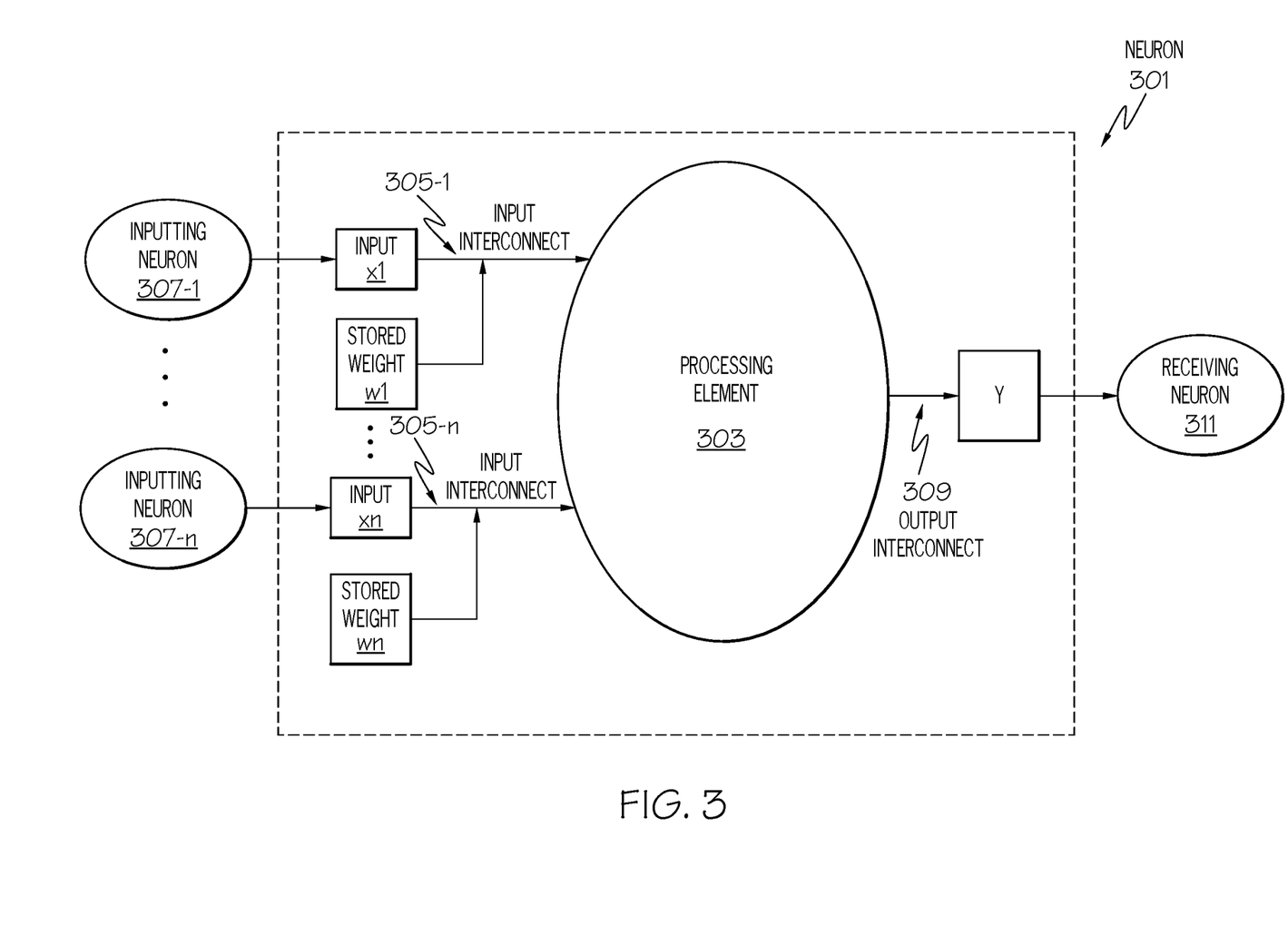
FIG. 3 illustrates exemplary aspects of a neural network in accordance with one or more embodiments of the present invention.

With reference now to FIG. 3, an exemplary neuron 301 used in a DNN is depicted.

As depicted, neuron 301 has a processing element 303 (e.g., a processor such as one of the processor(s) 103 shown in FIG. 1), which can be analogous to the soma in a biological neuron in that it combines depicted inputs $x_1$-$x_n$ and stored weights $w_1$-$w_n$ received from respective input interconnects 305-1 and 305-$n$, which are analogous to the dendrites found in a biological neuron. That is, electronic signals from inputting neurons 307-1 and 307-$n$ are sent as respective inputs $x_1$-$x_n$ to the processing element 303 via respective input interconnects 305-1 and 305-$n$. These inputs $x_1$-$x_n$ are associated with (e.g., multiplied by) respective stored weights $w_1$-$w_n$, which are known as "parameters" in a DNN (including DNNs such as the RNN and/or HRNN introduced above).

The processing element 303 then processes the weighted inputs $x_1$ through $x_n$. In some embodiments, processing element 303 sums up the values of the weighted inputs $x_1$ through $x_n$. However, in some embodiments, processing element 303 processes the weighted inputs $x_1$-$x_n$ using a more complex logistic function, such as a sigmoidal function. For example, processing element 202 may first sum up the weighted inputs to generate "$z$", such that:

$$z = x_1 w_1 + \ldots x_n w_n$$

The processing element 303 may then calculate a value for "y", such that:

$$y = \frac{1}{1 = e^{-z}}$$

Thus, y is a value between 0 and 1. When the weighted sum z is very negative, the value of y is very close to 0. When the weighted sum z is very large and positive, the value of y is very close to 1. Thus, such sigmoidal neurons are more useful than linear neurons since they provide outputs that are more binary, and thus are more useful in learning algorithms.

Returning now to FIG. 3, once processing element 303 has processed the weighted inputs $x_1$ through $x_n$, the output (i.e., y) is sent via an output interconnect 309 (analogous to an axon in a biological neuron) to a receiving neuron 311 (e.g., as inputs to the receiving neuron 311).

A deep neural network (DNN) may have numerous hidden neurons and numerous input neurons. An example will be discussed with reference to FIG. 4.

Figure 4:
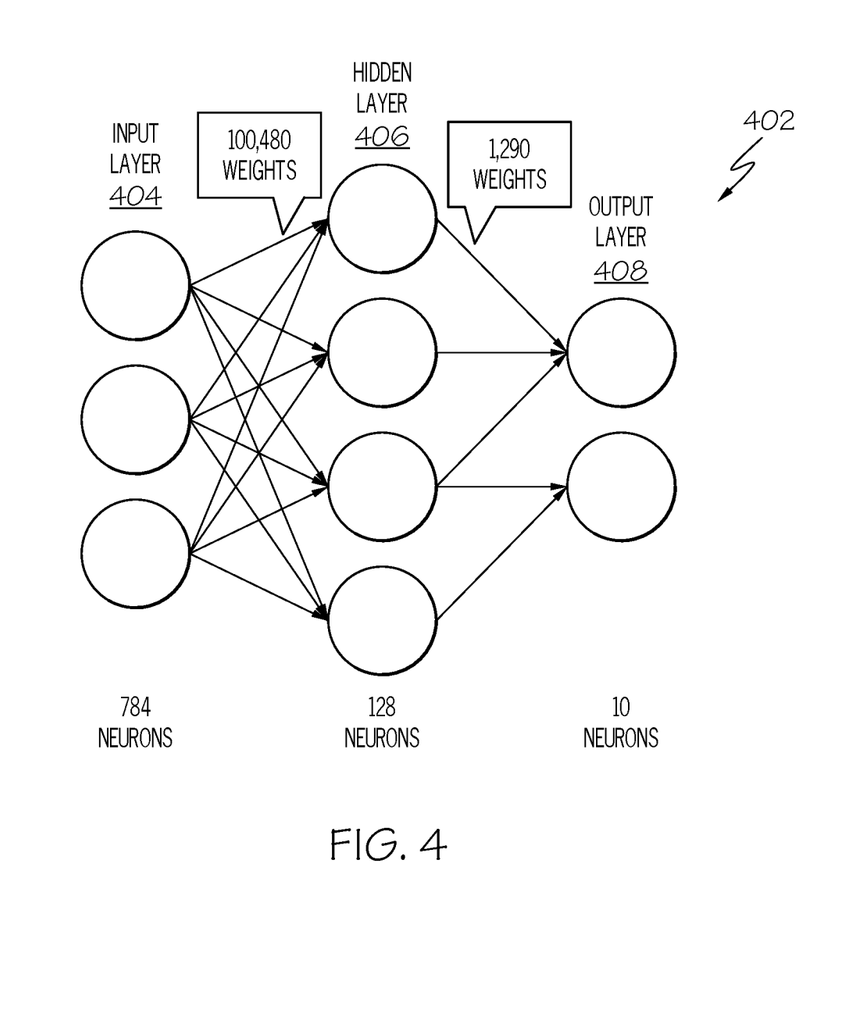
FIG. 4 depicts another example of aspects of a neural network in accordance with one or more embodiments of the present invention.

FIG. 4 depicts an example of aspects of a neural network in accordance with one or more embodiments of the present invention. As depicted, DNN 402 includes input neuron layer 404, hidden neuron layer 406, and output neuron layer 408.

In some embodiments and by way of example only, DNN 402 may be used to examine and interpret resources such as text documents, video files, etc. in order to determine whether or not they are in fact guidelines that can be used to perform a certain task. By way of further example only, assume further that such resources are captured as inputs depicted in input layer 404. For purposes of this example only, assume that input layer 404 has 784 neurons, 128 neurons in hidden layer 406 and 10 neurons in the output layer 408. However, since there are numerous different connections between the 784 neurons in input layer 404 and the 128 neurons in the hidden layer 406, each of these connections has one or more weights $w_1$-$w_n$. For purposes of this example only, assume that there are 100,480 weights associated with such connections.

There are a relatively smaller number of connections between the number of neurons in the hidden layer 406 and the smaller number of neurons in the output layer 408 (10 in this example). A (non-limiting) example of an output layer is the layer that outputs an "answer" (e.g., an interpretation of whether or not a resource is in fact a guideline for performing some process).

Figure 5:
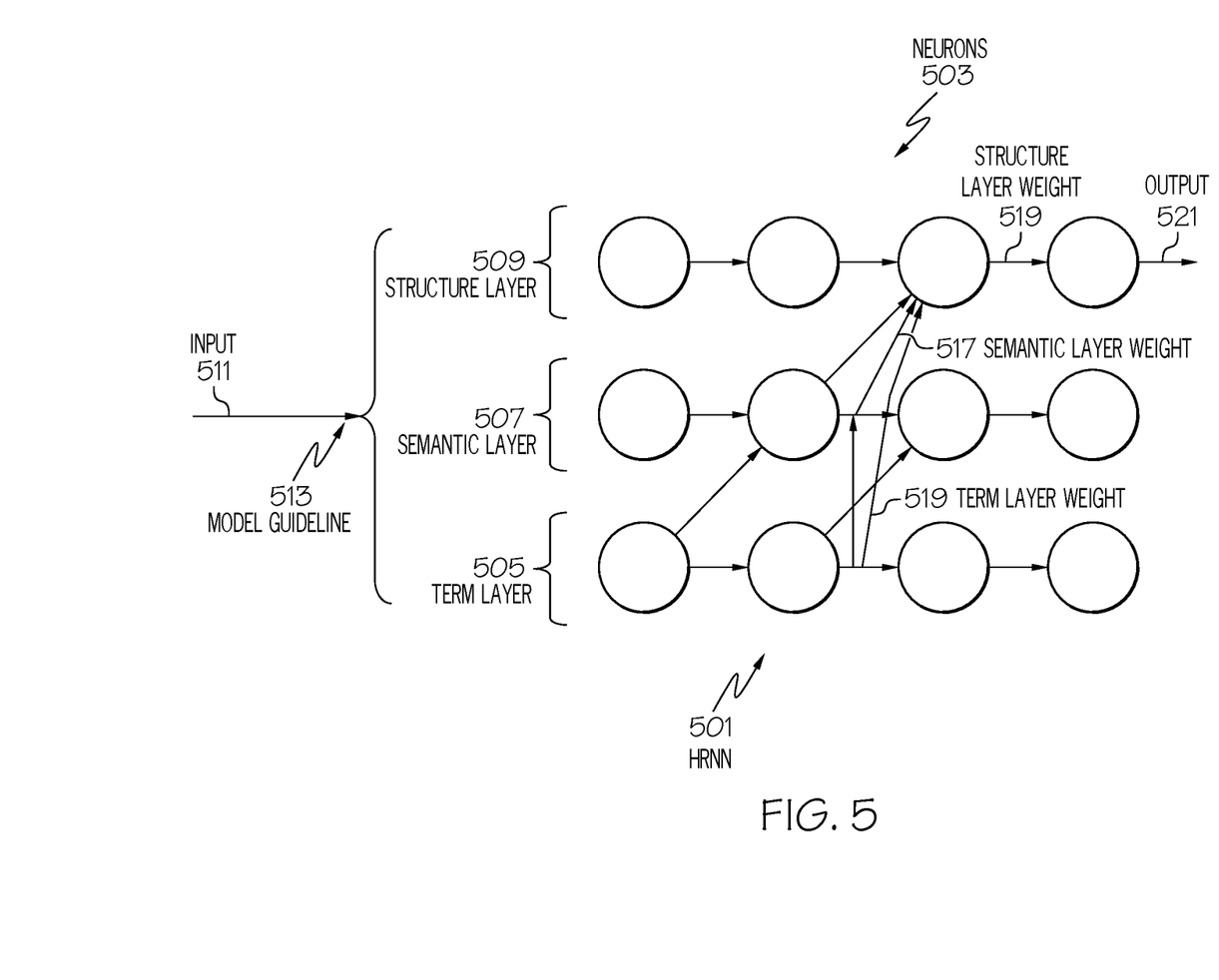
FIG. 5 illustrates exemplary layers of a neural network in accordance with one or more embodiments of the present invention.

FIG. 5 depicts exemplary layers of a hierarchical recursive neural network (HRNN) 501 in accordance with one or more embodiments of the present invention. For purposes of clarity, all arrows between nodes in the HRNN 501 are depicted as traveling in one direction. However, it is to be understood that any node in the HRNN 501 can be returned to from other nodes in the HRNN 501.

As depicted, HRNN 501 has three layers of neurons 503 (where each of the neurons 503 is depicted by a different circle, also referred to herein as a "node" in the HRNN 501). The three layers of neurons 503 are depicted as term layer 505 (which is a DNN dedicated to interpreting terms/words found in a resource); semantic layer 507 (which is a DNN dedicated to interpreting the semantic structure of the resource based on the outputs of term layer 505); and a structure layer 509 (which is a DNN dedicated to interpreting the structure of the resource based on the outputs of semantic layer 507 and/or the term layer 505). An input 511 (e.g., terms from a text document, metadata from a video file describing contents of the video file, etc.) is input into the term layer 505, the semantic layer 507, and the structure layer 509 of the HRNN 501. Furthermore, a model guideline 513 (i.e., a guideline known to provide directions/instructions for performing a specific task) is input into the term layer 505, the semantic layer 507, and the structure layer 509 of the HRNN 501, such that the HRNN 501 can compare the input 511 to the model guideline 513.

Thus, the neurons 503 in the term layer 505 compare terms/words from the input 511 to a model guideline 513

(text document or video file). That is, the neurons in the term layer 505 determine how closely terms/words in a particular document (input 511) match the model guideline 513. Sequential neurons in the term layer 505 generate a cumulative weighting (indicated by horizontal arrows) that are sent along with the terms being evaluated from the input 511. Thus, term layer weight 519 describes how closely the terms in input 511 match the model guideline 513, as determined by neurons 503 to the left of the term layer weight 519. This term layer weight 519 is sent to the structure layer 509.

As shown by other arrows between term layer 505 and semantic layer 507, the terms found in both the input 511 and the model guideline 513 are sent to the semantic layer 507, which identifies the semantic meaning of the terms evaluated in the term layer 505. That is, the terms found in both the input 511 and the model guideline 513 are determined by the semantic layer 507 to have certain meanings based on their context. For example, if the terms in the input 511 and the model guideline 513 include terms such as "lab", "disease", and "sample", then the semantic layer 507 will determine that the context of the input 511 and the model guideline 513 is "medical care", and thus the "sample" is a biological sample and the lab is a medical laboratory.

The terms from the input 511 and the model guideline 513 that have been evaluated by the term layer 505 and the semantic layer 507 also provide inputs to the structure layer 509 to determine the structure of the input 511. For example, assume that the input 511 is a text document. The structure of the input 511 may be (but is not limited to) a compare-contrast structure (in which the text document examines similarities and differences between two or more ideas, treatments, processes, etc.); a cause-effect structure (in which the text document presents causal relationships between events or concepts found in the text document); a sequence structure (in which the text document provides a sequential chronological description of steps to be taken in accordance with a guideline); a problem-structure structure (in which the text document presents a problem, a solution to the problem, and an explanation of advantages and disadvantages of the solution); and/or a descriptive structure (in which the text document presents a general description of a solution to a problem in order to give the user a high-level understanding of the guideline). These different structures are all dependent upon the terms found in the input 511 (as evaluated by the term layer 505) and/or based on the semantics of the terms from the input 511 (as determined by the semantic layer 507).

Based on the processes performed by the semantic layer 507, a semantic layer weight 517 is sent to the structure layer 509. If the semantics of input 511 closely match the semantics of the model guideline 513, then the semantic layer weight 517 is given a large value, thus indicating to the structure layer 509 that the input 511 is showing a high likelihood of input 511 being a guideline document, just as a high value represented by term layer weight 519 (based on a high match of terms between the input 511 and the model guideline 513) indicates to the semantic layer 507 and/or the structure layer 509 that there is a high likelihood of input 511 being a guideline document. Structure layer 509 also generates a structure layer weight 519, which indicates to the output 521 the likelihood of input 511 being a document based on the weights and inputs from the term layer 505, the semantic layer 507, and the structure layer 509.

Figure 6:
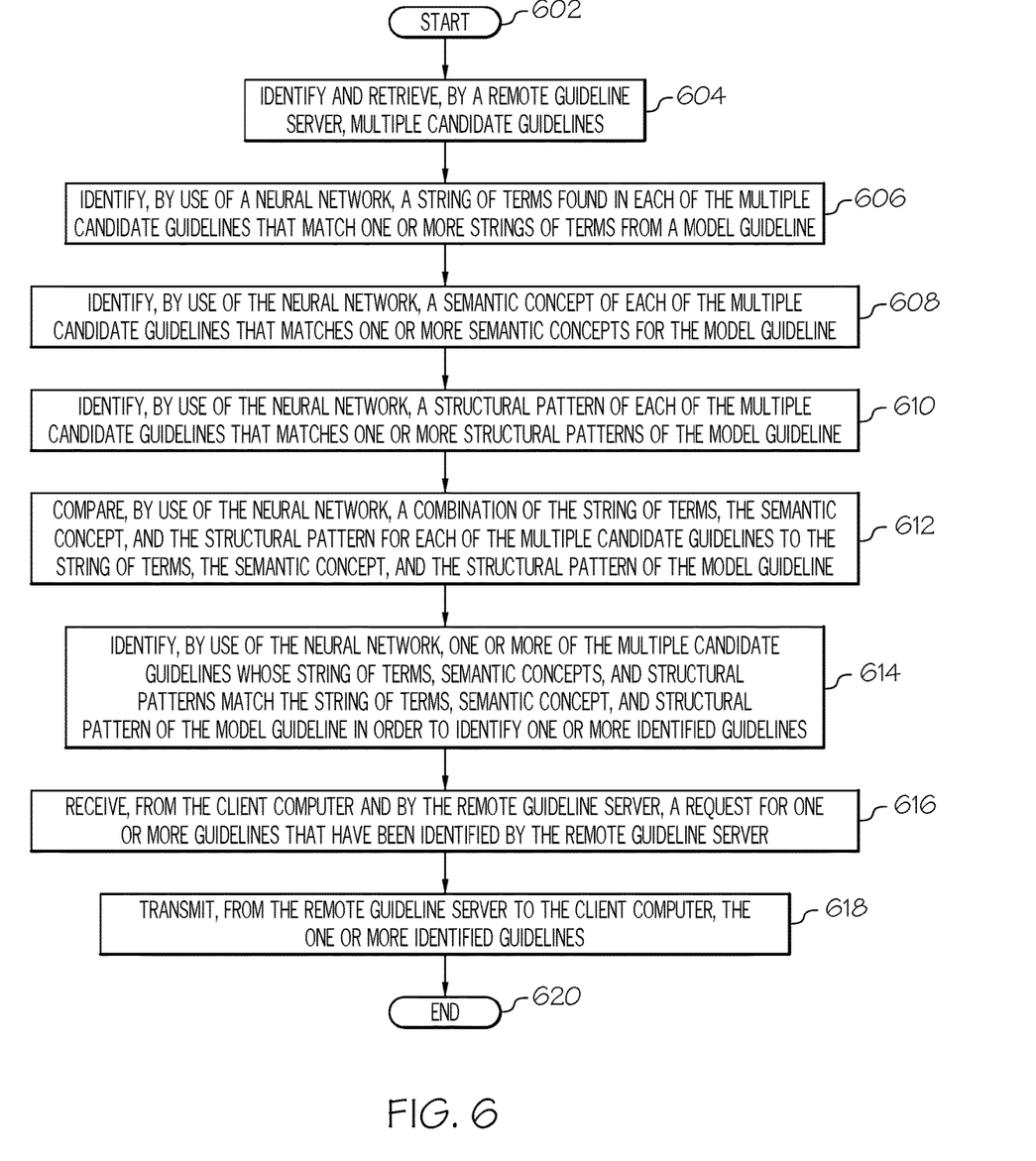
FIG. 6 depicts an exemplary method in accordance with one or more embodiments of the present invention.

With reference now to FIG. 6, a high-level overview of one or more embodiments of the present invention is presented.

After initiator block 602, a client computer (e.g., client computer 151 shown in FIG. 2) transmits instructions to a remote guideline server (e.g., remote guideline server 153 shown in FIG. 2) to retrieve and evaluate multiple candidate guidelines (e.g., candidate guidelines 202a-202n shown in FIG. 2).

As described in block 604, this directs the remote guideline server to identify and retrieve the multiple candidate guidelines.

As described in block 606, the instructions from the client server further cause the remote guideline server to use a neural network (e.g., HRNN 501 shown in FIG. 5) to identify a string of terms found in each of the multiple candidate guidelines (e.g., input 511 shown in FIG. 5) that match one or more strings of terms from a model guideline (e.g., model guideline 513 shown in FIG. 5).

As described in block 608, the instructions from the client server further cause the remote guideline server to use the neural network to identify a semantic concept of each of the multiple candidate guidelines that matches one or more semantic concepts for the model guideline, where the semantic concept of each of the multiple candidate guidelines is based on the string of terms found in each of the multiple candidate guidelines (as described in FIG. 5).

As described in block 610, the instructions from the client server further cause the remote guideline server to use the neural network to identify a structural pattern of each of the multiple candidate guidelines that matches one or more structural patterns of the model guideline, where the structural pattern of each of the multiple candidate guidelines is based on the semantic concept of each of the multiple candidate guidelines and the string of terms found in each of the multiple candidate guidelines.

As described in block 612, the instructions from the client server further cause the remote guideline server to use the neural network to compare a combination of the string of terms, the semantic concept, and the structural pattern for each of the multiple candidate guidelines to the string of terms, the semantic concept, and the structural pattern of the model guideline.

As described in block 614, the instructions from the client server further cause the remote guideline server to use the neural network to identify one or more of the multiple candidate guidelines whose string of terms, semantic concepts, and structural patterns match the string of terms, semantic concept, and structural pattern of the model guideline in order to identify one or more identified guidelines.

As described in block 616, the client computer transmits, to the remote guideline server, a request for one or more guidelines that have been identified by the remote guideline server (based on the comparison between the candidate guidelines and the model guideline).

As described in block 618, the client computer then receives the one or more identified guidelines from the remote guideline server.

The flow-chart ends at terminator block 620.

In an embodiment of the present invention, the instructions from the client computer further instruct the remote guideline server to use the neural network to modify the semantic concept based on the string of terms in each of the multiple candidate guidelines to create a modified semantic concept for each of the multiple candidate guidelines. That is, output weights from nodes in term layer 505 cause the summed weights/values of the nodes in the semantic layer 507 to be modified. That is, if there is a high matching level of terms between the input 511 and the model guideline 513, then the semantic layer 507 will more heavily weight the outputs from the term layer 505, such that the semantics determined by the semantic layer 507 will also have a greater weight (i.e., are more trusted as being accurate).

In an embodiment of the present invention, the instructions from the client computer further use the neural network to modify the structure patterns based on the modified semantic concept of each of the multiple candidate guidelines to create a modified structure pattern for each of the multiple candidate guidelines. That is, based on the results of the analysis of input 511 by the semantic layer 507 (and/or by the term layer 505), then the output 521 from the structure layer 509 is further modified.

In an embodiment of the present invention, guidelines (both the input 511 and the model guideline 513 shown in FIG. 5) are text instructions, such that the string of terms are words in the text instructions. As such, the semantic concept identifies a contextual meaning of the words, and the structure pattern identifies an instructional style of the guidelines as presented by the terms/words in the text document.

In an embodiment of the present invention, each of the guidelines (both the input 511 and the model guideline 513 shown in FIG. 5) is a video, and the string of terms are metadata that describes concepts found in the video. For example, the video may be a video instruction on how to perform cardiovascular resuscitation (CPR). Metadata associated with the video may include the terms "heart", "resuscitation", "CPR", etc. As such, the semantic concept identifies a contextual meaning of the metadata, and the structure pattern identifies an instructional style of the video. That is, the structure pattern may be one of questions and answers implied in the metadata. For example, if the metadata included the terms "How do you give CPR?" and "CPR is given by a combination of assisted breathing and cardiac compression", then structure layer 509 in HRNN 501 would determine that the structure of the video is one of questions and answers.

In an embodiment of the present invention, the client computer transmits, to the remote guideline server, a rating range for the one or more identified guidelines. The client computer also transmits, to the remote guideline server, a request for one or more of the identified guidelines that fall within the rating range. The client computer then receives, from the remote guideline server, the one or more identified guidelines that fall within the rating range. For example, the client computer may request guidelines that have been identified by the remote guideline server as having greater than a 50% match of terms with the model guideline 513 (as determined by term layer 505), greater than a 75% match of semantics with the model guideline 513 (as determined by semantic layer 507), and greater than a 90% match of structure with the model guideline 513 (as determined by structure layer 509). As such, the remote guideline server will only return candidate guidelines (from the candidate guidelines 202a-202n) that meet these ranges.

In an embodiment of the present invention, the guidelines identified by the remote guideline server as described herein are guidelines for upgrading software in the client computer. For example, an identified guideline may be a direction to install a BIOS patch into a BIOS chip in the client computer. As such, when the client computer (e.g., client computer 151) receives from the remote guideline server 153 a guideline (e.g., candidate guideline 202a) for upgrading software in the client computer, a link within the received guideline is executed, such that the BIOS patch 204 shown in FIG. 2 is sent from the software server 155 to the client computer 151, where it is automatically installed (e.g., by PIGNN 147 shown in FIG. 1) in the BIOS chip 157, thus improving the functionality of computer 101.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
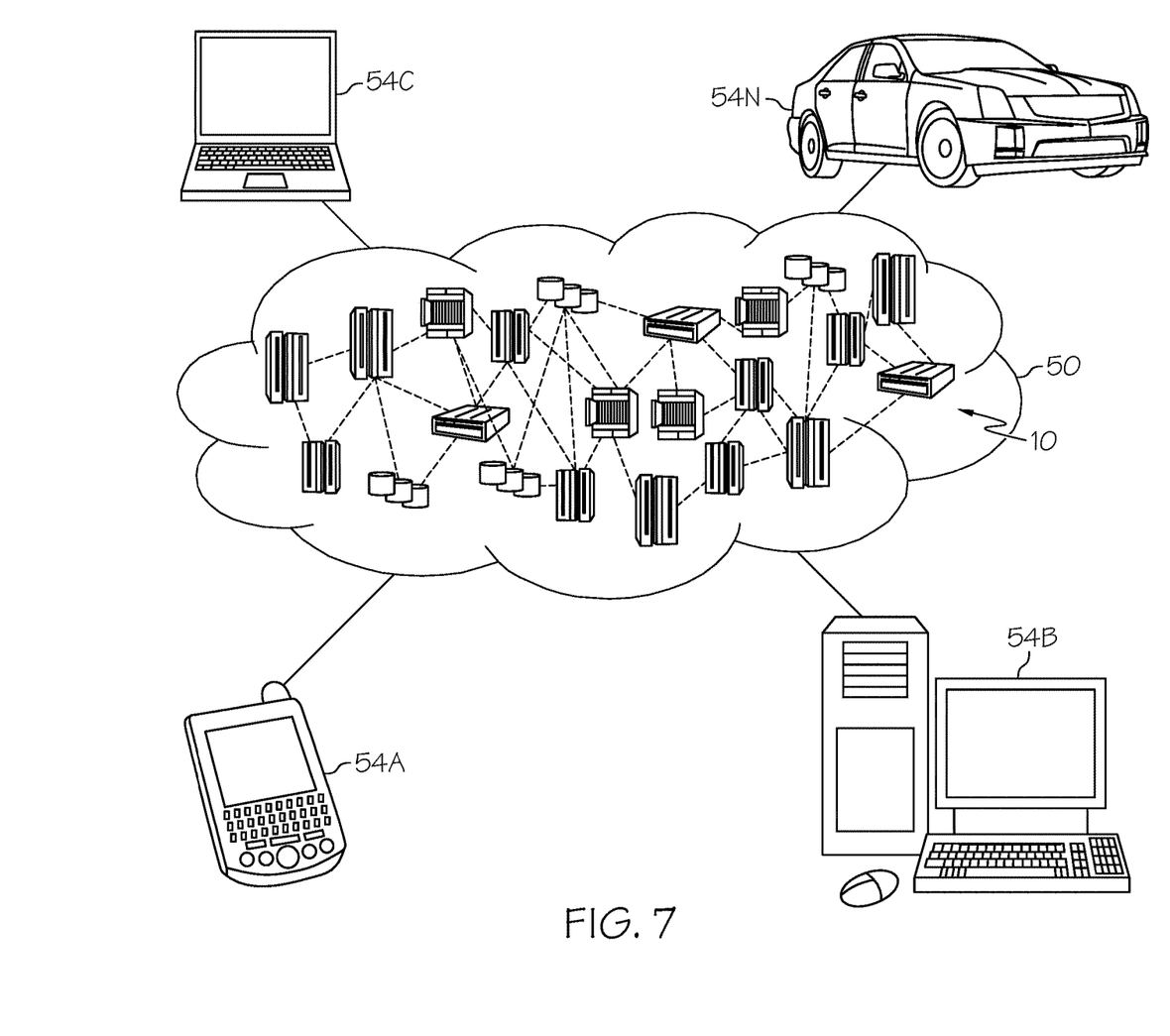
FIG. 7 depicts a cloud computing environment in accordance with one or more embodiments of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
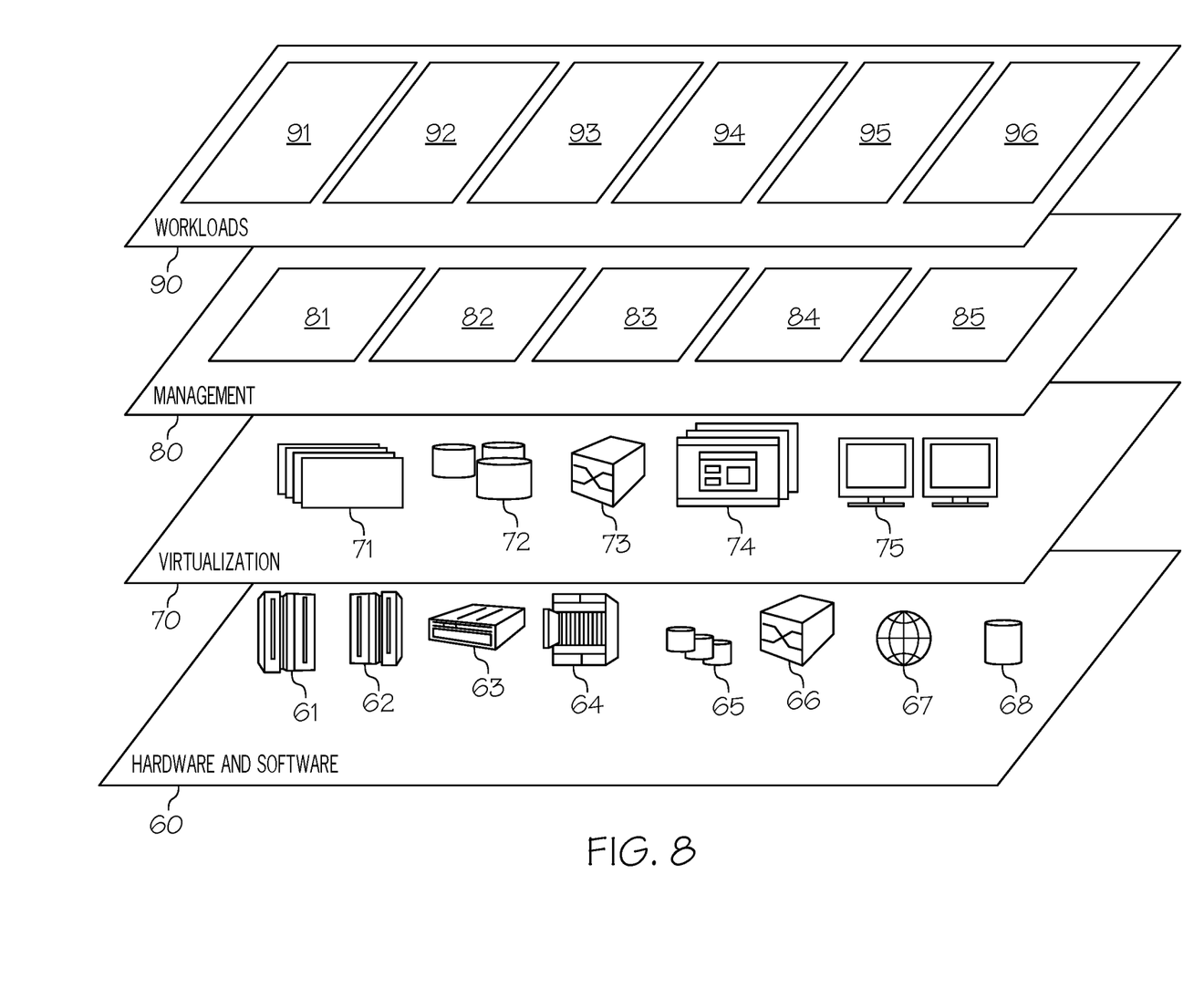
FIG. 8 depicts abstraction model layers of a cloud computing environment in accordance with one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural network processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
transmitting, from a client computer, instructions to a remote guideline server to retrieve and evaluate multiple candidate guidelines, wherein the instructions direct the remote guideline server to:
identify and retrieve multiple candidate guidelines;
identify, by use of a neural network, a string of terms found in each of the multiple candidate guidelines that match one or more strings of terms from a model guideline;
identify, by use of the neural network, a semantic concept of each of the multiple candidate guidelines that matches one or more semantic concepts from the model guideline, wherein the semantic concept of each of the multiple candidate guidelines is based on the string of terms found in each of the multiple candidate guidelines;
identify, by use of the neural network, a structural pattern of each of the multiple candidate guidelines that matches one or more structural patterns of the model guideline, wherein the structural pattern of each of the multiple candidate guidelines is based on the semantic concept of each of the multiple candidate guidelines and the string of terms found in each of the multiple candidate guidelines, wherein the model guideline is a text document that describes a set of tasks for solving a problem with a computer system, wherein the structural pattern is a structure of the text document that includes a compare-contrast structure in which the text document examines similarities and differences between two or more troubleshooting processes; a cause-effect structure in which the text document presents causal relationships between events described in the text document; a sequence structure in which the text document provides a sequential chronological description of steps to be taken in accordance with the model guideline; a problem-structure structure in which the text document presents the problem with the computer system, a solution to the problem, and an explanation of advantages and disadvantages of the solution; and a descriptive structure in which the text document presents a general description of the solution to the problem with the computer system in order to give the user a high-level understanding of the model guideline;
compare, by use of the neural network, a combination of the string of terms, the semantic concept, and the structural pattern for each of the multiple candidate guidelines to the string of terms, the semantic concept, and the structural pattern of the model guideline; and
identify, by use of the neural network, one or more of the multiple candidate guidelines whose string of terms, semantic concepts, and structural patterns match the string of terms, semantic concept, and structural pattern of the model guideline in order to identify one or more identified guidelines;
transmitting, from the client computer to the remote guideline server, a request for one or more guidelines that have been identified by the remote guideline server; and
receiving, by the client computer, the one or more identified guidelines from the remote guideline server.

2. The method of claim 1, further comprising:
instructing the remote guideline server to modify, by use of the neural network, the semantic concept based on the string of terms in each of the multiple candidate guidelines to create a modified semantic concept for each of the multiple candidate guidelines.

3. The method of claim 2, further comprising:
instructing the remote guideline server to modify, by use of the neural network, the structural patterns based on the modified semantic concept of each of the multiple candidate guidelines to create a modified structural pattern for each of the multiple candidate guidelines.

4. The method of claim 1, wherein the multiple candidate guidelines are text instructions, wherein the string of terms are words, wherein the semantic concept identifies a contextual meaning of the words, and wherein the structural pattern identifies an instructional style of the guidelines.

5. The method of claim 1, wherein each of the multiple candidate guidelines is a video, wherein the string of terms are metadata that describes concepts found in the video, wherein the semantic concept identifies a contextual meaning of the metadata, and wherein the structural pattern identifies an instructional style of the video.

6. The method of claim 1, further comprising:
transmitting, from the client computer to the remote guideline server, a rating range for the one or more identified guidelines;
transmitting, from the client computer to the remote guideline server, a request for one or more of the identified guidelines that fall within the rating range; and
receiving, by the client computer and from the remote guideline server, the one or more identified guidelines that fall within the rating range.

7. The method of claim 1, wherein one or more of the one or more identified guidelines are guidelines for upgrading software in the client computer, wherein the guidelines for upgrading software in the client computer include an executable link to a basic input/output system (BIOS) patch for a BIOS chip in the client computer, and wherein the method further comprises:
receiving, by the client computer, a guideline for upgrading software in the client computer;
executing, by the client computer, a link to a software server that serves a BIOS patch, wherein the link is embedded in the guideline for upgrading software in the client computer;
in response to executing the link, receiving, by the client computer, the BIOS patch from the software server, and
automatically installing, by the client computer, the received BIOS patch into the BIOS chip in the client computer.

8. A computer program product for identifying guidelines using remote neural network processing, the computer program product comprising a non-transitory computer readable storage device having program instructions embodied therewith, the program instructions readable and executable by a computer to:

transmit, from a client computer, instructions to a remote guideline server to retrieve and evaluate multiple candidate guidelines, wherein the instructions direct the remote guideline server to:

identify and retrieve multiple candidate guidelines;

identify, by use of a neural network, a string of terms found in each of the multiple candidate guidelines that match one or more strings of terms from a model guideline;

identify, by use of the neural network, a semantic concept of each of the multiple candidate guidelines that matches one or more semantic concepts from the model guideline, wherein the semantic concept of each of the multiple candidate guidelines is based on the string of terms found in each of the multiple candidate guidelines;

identify, by use of the neural network, a structural pattern of each of the multiple candidate guidelines that matches one or more structural patterns of the model guideline, wherein the structural pattern of each of the multiple candidate guidelines is based on the semantic concept of each of the multiple candidate guidelines and the string of terms found in each of the multiple candidate guidelines, wherein the model guideline is a text document that describes a set of tasks for solving a problem with a computer system, wherein the structural pattern is a structure of the text document that includes a compare-contrast structure in which the text document examines similarities and differences between two or more troubleshooting processes; a cause-effect structure in which the text document presents causal relationships between events described in the text document; a sequence structure in which the text document provides a sequential chronological description of steps to be taken in accordance with the model guideline; a problem-structure structure in which the text document presents the problem with the computer system, a solution to the problem, and an explanation of advantages and disadvantages of the solution; and a descriptive structure in which the text document presents a general description of the solution to the problem with the computer system in order to give the user a high-level understanding of the model guideline;

compare, by use of the neural network, a combination of the string of terms, the semantic concept, and the structural pattern for each of the multiple candidate guidelines to the string of terms, the semantic concept, and the structural pattern of the model guideline; and         identify, by use of the neural network, one or more of the multiple candidate guidelines whose string of terms, semantic concepts, and structural patterns match the string of terms, semantic concept, and structural pattern of the model guideline in order to identify one or more identified guidelines;

receive, from a client computer, a request for one or more guidelines that have been identified by the remote guideline server; and     transmit, to the client computer, the one or more identified guidelines from the remote guideline server.

9. The computer program product of claim 8, wherein the program instructions are further readable and executable by a computer to:

modify, by use of the neural network, the semantic concept based on the string of terms in each of the multiple candidate guidelines to create a modified semantic concept for each of the multiple candidate guidelines.

10. The computer program product of claim 9, wherein the program instructions are further readable and executable by a computer to:

modify, by use of the neural network, the structural patterns based on the modified semantic concept of each of the multiple candidate guidelines to create a modified structural pattern for each of the multiple candidate guidelines.

11. The computer program product of claim 8, wherein the multiple candidate guidelines are text instructions, wherein the string of terms are words, wherein the semantic concept identifies a contextual meaning of the words, and wherein the structural pattern identifies an instructional style of the guidelines.

12. The computer program product of claim 8, wherein the program instructions are further readable and executable by a computer to:

receive, from the client computer, a rating range for the one or more identified guidelines;

receive, from the client computer, a request for one or more of the identified guidelines that fall within the rating range; and     transmit, to the client computer, the one or more identified guidelines that fall within the rating range.

13. The computer program product of claim 8, wherein the program instructions are provided as a service in a cloud environment.

14. A system comprising:

one or more processors;

one or more computer readable memories operably coupled to the one or more processors;

one or more computer readable storage mediums operably coupled to the one or more computer readable memories; and     program instructions stored on at least one of the one or more computer readable storage mediums for execution by at least one of the one or more processors via at least one of the one or more computer readable memories, the program instructions comprising:

program instructions to transmit, from a client computer, instructions to a remote guideline server to retrieve and evaluate multiple candidate guidelines, wherein the instructions direct the remote guideline server to:

identify and retrieve multiple candidate guidelines;

identify, by use of a neural network, a string of terms found in each of the multiple candidate guidelines that match one or more strings of terms from a model guideline;

identify, by use of the neural network, a semantic concept of each of the multiple candidate guidelines that matches one or more semantic concepts from the model guideline, wherein the semantic concept of each of the multiple candidate guidelines is based on the string of terms found in each of the multiple candidate guidelines;

identify, by use of the neural network, a structural pattern of each of the multiple candidate guidelines that matches one or more structural patterns of the model guideline, wherein the structural pattern of each of the multiple candidate guidelines is based on the semantic concept of each of the multiple candidate guidelines and the string of terms found in each of the multiple candidate guidelines, wherein the model guideline is a text document that describes a set of tasks for solving a problem with a computer system, wherein the structural pattern is a structure of the text document that includes a compare-contrast structure in which the text document examines similarities and differences between two or more troubleshooting processes; a cause-effect structure in which the text document presents causal relationships between events described in the text document; a sequence structure in which the text document provides a sequential chronological description of steps to be taken in accordance with the model guideline; a problem-structure structure in which the text document presents the problem with the computer system, a solution to the problem, and an explanation of advantages and disadvantages of the solution; and a descriptive structure in which the text document presents a general description of the solution to the problem with the computer system in order to give the user a high-level understanding of the model guideline;

compare, by use of the neural network, a combination of the string of terms, the semantic concept, and the structural pattern for each of the multiple candidate guidelines to the string of terms, the semantic concept, and the structural pattern of the model guideline; and identify, by use of the neural network, one or more of the multiple candidate guidelines whose string of terms, semantic concepts, and structural patterns match the string of terms, semantic concept, and structural pattern of the model guideline in order to identify one or more identified guidelines;

program instructions to transmit, from the client computer to the remote guideline server, a request for one or more guidelines that have been identified by the remote guideline server; and program instructions to receive, by the client computer, the one or more identified guidelines from the remote guideline server.

15. The system of claim 14, further comprising:

program instructions to instruct the remote guideline server to modify, by use of the neural network, the semantic concept based on the string of terms in each of the multiple candidate guidelines to create a modified semantic concept for each of the multiple candidate guidelines.

16. The system of claim 15, further comprising:

program instructions to instruct the remote guideline server to modify, by use of the neural network, the structural patterns based on the modified semantic concept of each of the multiple candidate guidelines to create a modified structural pattern for each of the multiple candidate guidelines.

17. The system of claim 14, wherein the multiple candidate guidelines are text instructions, wherein the string of terms are words, wherein the semantic concept identifies a contextual meaning of the words, and wherein the structural pattern identifies an instructional style of the guidelines.

18. The system of claim 14, wherein the model guideline is a text guideline that provides instructions for performing a particular task, wherein the neural network is a hierarchical recursive neural network (HRNN), wherein the HRNN comprises a term layer that is a first Deep Neural Network (DNN) that is dedicated to interpreting and comparing words found in the multiple candidate guidelines to words in the model guideline, wherein the HRNN comprises a semantic layer that is a second DNN dedicated to interpreting and comparing a semantic relationship among words found in the multiple candidate guidelines to a semantic relationship among words found in the model guideline, and wherein the HRNN comprises a structure layer that is a third DNN dedicated to interpreting and comparing overall structures of the multiple candidate guidelines to an overall structure of the model guideline based on the outputs of the semantic layer and the term layer.

19. The system of claim 14, wherein the program instructions are provided as a service in a cloud environment.

* * * * *